United States Patent [19]

Frankenberger et al.

[11] Patent Number: 5,040,422
[45] Date of Patent: Aug. 20, 1991

[54] PROCEDURE FOR FLOW MEASUREMENT AND EQUIPMENT THEREFOR

[75] Inventors: Horst Frankenberger, Promenadenweg 5, 2407 Bad Schwartau; Manfred Salamon, Lübeck, both of Fed. Rep. of Germany

[73] Assignee: Horst Frankenberger, Bad Schwartau, Fed. Rep. of Germany

[21] Appl. No.: 485,203

[22] Filed: Feb. 26, 1990

[30] Foreign Application Priority Data

Mar. 4, 1989 [DE] Fed. Rep. of Germany ....... 3906998

[51] Int. Cl.$^5$ .............................................. G01F 1/708
[52] U.S. Cl. .................................. 73/861.05; 128/692
[58] Field of Search ........... 73/861.05, 861.08, 861.95; 128/691, 692, 693

[56] References Cited

U.S. PATENT DOCUMENTS

| 1,616,481 | 2/1927 | Alilen | 73/861.05 |
| 3,184,967 | 5/1965 | Rogers | 73/861.05 X |
| 3,242,729 | 3/1966 | Keiller | 73/861.08 |
| 4,152,935 | 5/1979 | Nagaishi et al. | |
| 4,186,601 | 2/1980 | Maruoka | |
| 4,393,719 | 7/1983 | Wiegand et al. | |
| 4,570,492 | 2/1986 | Walsh | 73/861.05 |
| 4,576,050 | 3/1986 | Lambert | 73/86.90 |

FOREIGN PATENT DOCUMENTS

| 50998 | 9/1981 | European Pat. Off. |
| 2752328 | 6/1978 | Fed. Rep. of Germany |
| 2944979 | 5/1981 | Fed. Rep. of Germany |

Primary Examiner—Herbert Goldstein
Attorney, Agent, or Firm—Sprung Horn Kramer & Woods

[57] ABSTRACT

A process and apparatus for flow measurement in which a marker volume is generated by the application of an electric voltage. This marker volume runs through a measured length in the direction of flow. The flow speed or a measurement linked to the flow speed is calculated from the transit time of the market volume. In adapting same for use in the characteristic flow range of body-related, aqueous fluids, that is, for measuring the flow of electrolytic, body-related fluids, the marker volume is generated by a short-term electrolytic breakdown of the fluid and the applied voltage is less than 24 Volts.

16 Claims, 3 Drawing Sheets

PROCEDURE FOR FLOW MEASUREMENT AND EQUIPMENT THEREFOR

BACKGROUND OF THE INVENTION

The invention involves a procedure for flow measurement in which a marker volume is generated by the application of electric voltage, this marker volume running through a measured length in the direction of flown the flow speed or a measurement linked to the flow speed being calculated from the transit time of the marker volume.

A number of technical measuring procedures are known for measuring the through-flow of flowing media. A procedure for the flow measurement of non-conducting media is described in DE-A 29 44 979, in which the flowing medium is marked in pulses by ionisation and the flow can be calculated from the time taken by the marker to pass through a measured length.

An alternative proposal in the same published patent application is to heat the flowing medium in pulses with an appropriately charged heating wire and to determine the migration of the marker volume from the elevated temperature by means of thermistors or thermocouples.

Furthermore, ionisation flow meters, such as those described in U.S. Pat. Nos. 4,393,719 and 4,186,601 are also state of the art. A high- voltage source is used to generate pulsed ionisation of the flowing non-conducting medium, for example a fuel and air mixture for combustion engines, and the migration of the ionisation cloud in a measured length is determined.

The saline solution procedure according to van Allen's method is also known from the state of the art (cf. v. Allen. Ch M, "The salt velocity method of water measurement" Trans-ASME Vol 45 (1923), p. 285 and Calame, H "Impfverfahren mit chemischen und radioaktiven Substanzen, thermisches und kalorisches Meß-verfahren" (Inoculation method with chemical and radioactive substances, thermal and caloric measurement procedure), VDI Reports No 86 (1964), page 59). In this method, shots of a salt solution with a specific minimum concentration are injected into the flowing medium over a short period. Two pairs of electrodes are used to determine the change in conductivity of the flowing medium caused by the incorporated cloud of solution, with the aid of oscillographic transit-time measurement. The transit time diagram is evaluated from an integral mean of the change in conductivity. The measuring accuracy of the procedure is relatively high at 1% if the measurement mean is taken.

However, those methods of flow measurement previously reported cannot be used or can be used with only an unsatisfactory result if a flow measurement is to be performed on aqueous body-related fluids. The term "body-related fluids" is intended to include both infusion solutions and drug solutions, as well as dialysis solutions and body fluids, particularly the blood fluids exchanged with dialysis solutions. Body-related fluids also include fluids drawn off from or eliminated by the body. In general, the term body-related fluids can be used with reference to aqueous endogenous fluids or fluids passed into the body for nutrition or therapy these fluids having to flow or be passed to the body at speeds typical of those in the body itself.

Although the flow velocity of these body-related fluids is generally relatively low, in the order of magnitude of $10^{-3}$ cm/second, there are large differences in the flow speeds to be measured because of the broad range of variation. Thus, for example, a minimum value of 0.1 ml per hour is required for infusion solutions while the maximum value is 1 l per hour. This is a difference of a factor of $10^4$.

SUMMARY OF THE INVENTION

The invention takes as its basis the objective of describing a procedure for flow measurement with which aqueous body-related fluids can be determined accurately at their typical flow velocities using measurement techniques and without any undue change taking place in the fluid, and particularly without the undesired addition of marker substances. The procedure should permit measurement of flow speed and also identification and differentiation of various fluids flowing in series.

According to the invention, this objective can be met by the marker volume for measuring the flow of electrolytic body-related fluids being generated by short-term electrolytic breakdown of the fluid, the voltage applied being less than 24 V. A fundamental requirement in this context is short-term electrolytic breakdown of the fluid to form a marker volume or a sequence of marker volumes by means of the application of a voltage which eliminates any possibility of risk even in the immediate vicinity of the body.

One useful embodiment of the procedure may consist of the marker volume being generated in the flowing fluid by means of direct current pulses The shift in concentration required to form the marker volume, which is created by electrolytic breakdown of the fluid using direct current pulses, can usefully be achieved by keeping the duration of the direct current pulses below 50 milliseconds with a pulse spacing greater than 1 second. The duration and sequence of the pulses should be selected such that only minimal substance reactions occur, which do not cause undue changes in the body-related fluid.

The migration of the marker volume through the measured length can be determined using various known measurement methods, preferably conductivity or potentiostatic measurement. Potentiostatic measurement can usefully be undertaken using semiconductor detectors. An additional advantage may be achieved where appropriate by applying a direct and/or alternating electrical field in the measured length. Other possible embodiments involve the test electrode constituting an active element instead of a collecting electrode, by means of which an electrophoretic effect can be initiated. This additional step yields increased measuring sensitivity in some cases.

It may also be advantageous in some cases to distinguish the type of flowing fluid using the measured value over time or to identify a specific flowing fluid in addition to determining the flow speed. This would be of interest, for example, if infusions of various infusion solutions were to be administered in series.

A useful sensor for implementing the procedure, in which a measured length consisting of two test electrodes is arranged, in a cavity determining the through-flow, downstream of at least one work electrode generating a marker volume, may be constructed such that a flow guide element is provided in the vicinity of the electrodes. Since the marker volume formed is broken down relatively quickly by the flow process and by diffusion processes within the flow, a relatively small distance of less than 10 mm between the test electrodes and the application of the transit-time length directly downstream of the work electrode is generally required. The use of the flow guide element means that the breakdown of the marker volume before it passes the two test electrodes situated one behind the other is prevented or substantially limited.

The flow guide element which is usefully situated in a diametral position may advantageously be designed as a plane electrode support. The electrodes may be located in strips on a lamellar electrode support. One advantageous embodiment may be achieved by the electrodes forming coatings, for example noble metal coatings of gold or platinum, on the plane electrode support.

A useful structural embodiment may be achieved by the sensor being designed as a hose coupling with appropriate connections. In this way a sensor of this type can be interpolated directly in an infusion line passing to the patient.

Although various embodiments of the test electrodes and/or the work electrode are possible, it may be useful to construct the test electrodes and/or the work electrode from two coatings arranged on the two sides of a dielectric support, each forming a capacitor arrangement. In this way a field concentration is achieved in the central cross-section area of the flow, which appears to be favourable for measurement purposes. Since the flow velocity is distributed over the cross-section in a rotationally symmetrical manner, the greatest flow velocity occurring in the central axis and a zero flow value being recorded directly at the surfaces of the internal wall, it would appear to be advantageous to arrange the work and/or test electrodes so that the essential major part of the flow in the central area is recorded.

The procedure described for flow measurement and the equipment described are particularly suitable for monitoring the flow speed of infusion fluids which may be administered using either a dropper device or one or more controlled infusion pumps. Precise monitoring of the flow speed and the volume administered means that it is also possible to use the equipment to administer several infusion fluids delivered by different infusion pumps/infusion injection pumps and to differentiate between these if required. The measurement procedure also offers the opportunity of simple flow detection in terms of yes/no detection, so that an alarm signal can be triggered when an infusion runs out, for example.

A useful device and sensor design may be constructed such that the work and test electrodes are arranged on a freely positionable electrode support.

This electrode support may advantageously be a catheter, the electrodes being located on the exterior of this catheter.

A preferred application of the measurement procedure and sensor consists in the monitoring of dialysis, both with respect to the blood flowing and as regards the exchange fluid flowing at the permeable exchange wall. This makes it possible for the first time to monitor the dialysis process accurately.

The drawing shows embodiments of the subject of the invention in schematic form, from which additional features of the invention can be seen. The figures show the following:

DETAILED DESCRIPTION OF THE INVENTION

Figure 1:
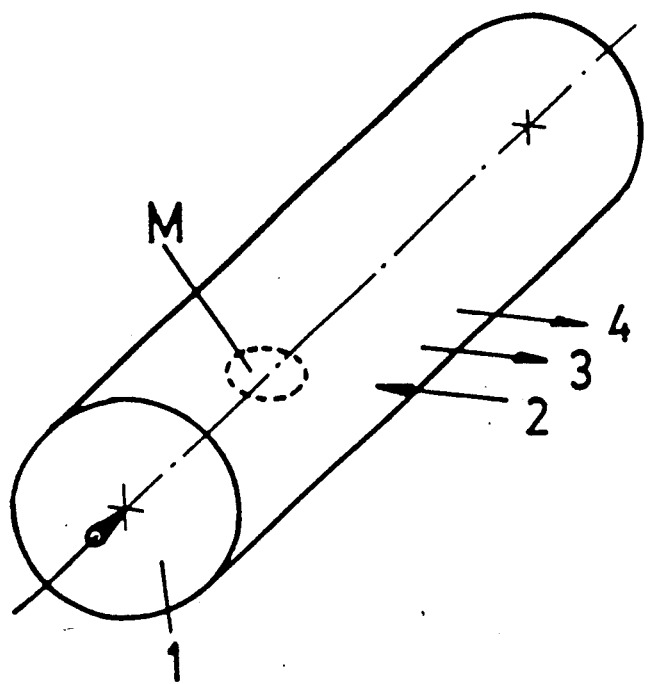
FIG. 1 an isometric representation of the basic measurement procedure.

In the basic diagram in FIG. 1, a work electrode 2 generating the marker volume is shown in a tubular flow volume 1 together with a subsequent first test electrode 3 and second test electrode 4, which form a measured length. The marker volume generated by the work electrode 2, indicated by M, is shifted by the flow and passes through the measured length formed by the test electrodes 3, 4, the transit time being used to determines the flow velocity and the progress of the measured signal over time, for example, being used for identification, determination being in various manners using various known measurement methods, such as the measurement of conductivity or potentiostatic measurement. In the case of conductivity measurement, the marker volume with greater conductivity migrates through the measured length, and the transit time may usefully be determined by measuring the passage of the maximum conductivity value.

Figure 2:
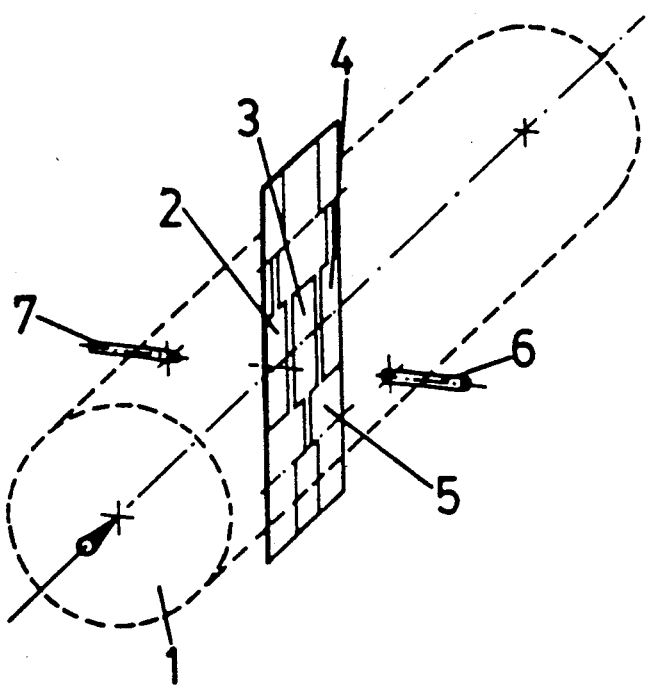
FIG. 2 an isometric representation of a sensor arrangement with work and test electrodes.

In the sensor embodiment shown in FIG. 2, a lamellar electrode support 5 of dielectric material is located in the cavity determining the flow volume 1, this support 5 carrying a work electrode 2 and the first test electrode 3 and second test electrode 4 in the form of strips of coating electrodes in a double-sided capacitor arrangement where appropriate. Additional electrodes 6, 7 are located in the wall area opposite electrodes 2, 3 and 4, as reference electrodes for homogenisation of the field.

Figure 3:
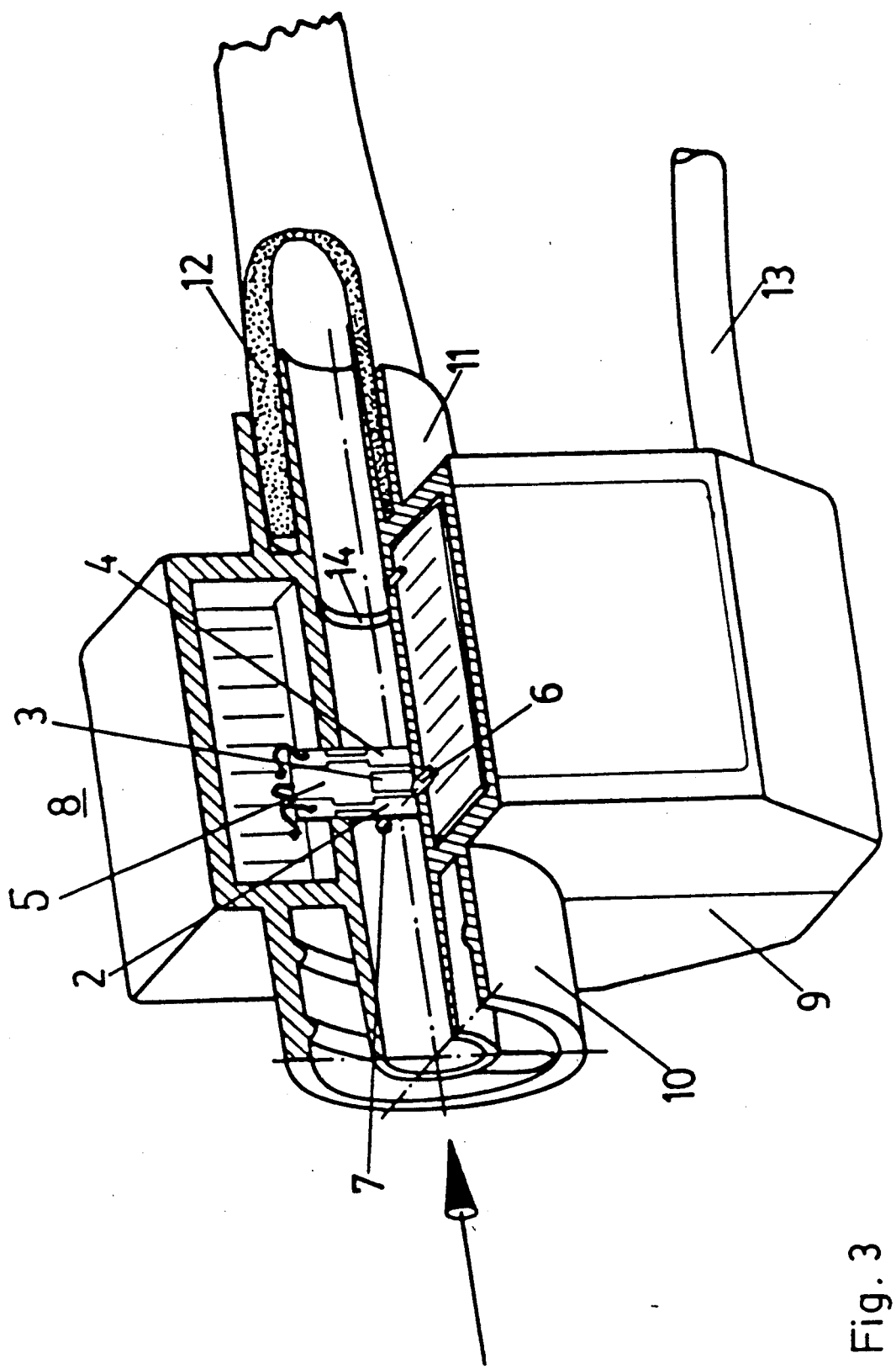
FIG. 3 a partial section of an isometric view of a sensor designed as a hose coupling.

FIG. 3 shows an integrated arrangement of the sensor within a hose coupling 8, with hose connections 10, 11 to a housing 9. An inserted infusion hose 12 is shown on one side. The work electrode 2 and the test electrodes 3, 4 are located on the lamellar support 5, and the two reference electrodes 6,7 are located in the vicinity of these electrodes, 2, 3 and 4. The sensor electronics are located on a board inside the split housing 9 using thin-film technology, and a cable coupling 13 serves to connect the device to an infusion and monitoring unit.

An additional mass potential electrode 14 is located in the wall area of the flow because of the plastic structure of the housing and the integrated tube section to accommodate the sensor components. The compact structure means that there are short connection lines between the sensor electrodes and the associated gain circuit, so that interference can be largely eliminated.

Figure 4:
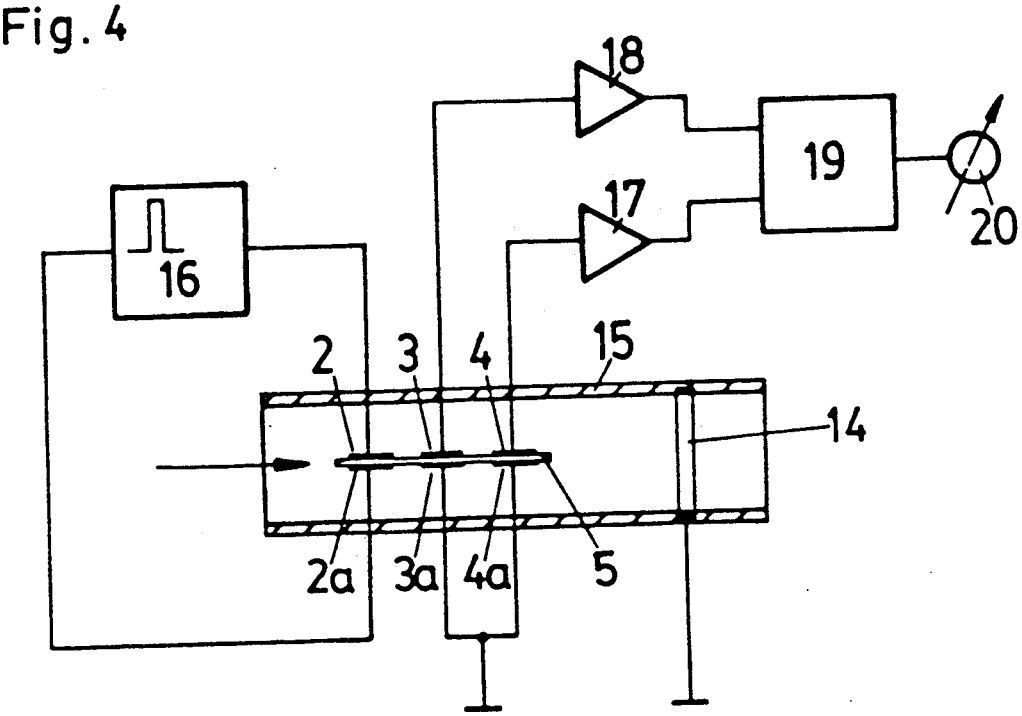
FIG. 4 a circuit arrangement for a sensor in accordance with FIG. 2 without reference electrodes.

FIG. 4 shows a tube 15 of plastic in which a sensor unit is accommodated. This unit consists of the work electrodes 2, 2a, which form a capacitor unit and are connected to a pulse generator 16 for the generation of direct current voltage pulses. The d.c. voltage pulses reach a peak voltage of some 4.5 Volts with a pulse length of 40 msec and a pulse sequence of about 1 second. The pulses are applied alternately as positive and negative voltage pulses. These work electrodes induce marker volumes in the flowing fluid, which migrate in the direction of flow to the transit-time measuring length formed by test electrodes 3, 3a and 4, 4a and the transit time of which is determined using a transit-time measuring device 19 after appropriate amplification of the signals by d.c. voltage amplifiers 17, 18. The time difference between the passage of the maximum conductivity change past the two test electrodes 3, 3a and 4, 4a, both of which also form a capacitor unit, is determined in this transit-time measuring device, which may be constructed in various manners using known models, for example using an oscillograph. The time difference corresponds with an appropriate calibration factor to the flow speed or the flowing volume and is displayed by an indicating instrument 20 or used as the input variable in a control circuit. The mass potential electrode 14 is used to discharge interfering scattered potentials. The electrode pairs 2, 2a, 3, 3a and 4, 4a are accommodated on a lamellar electrode support 5 in the form of coating strips.

Figure 5:
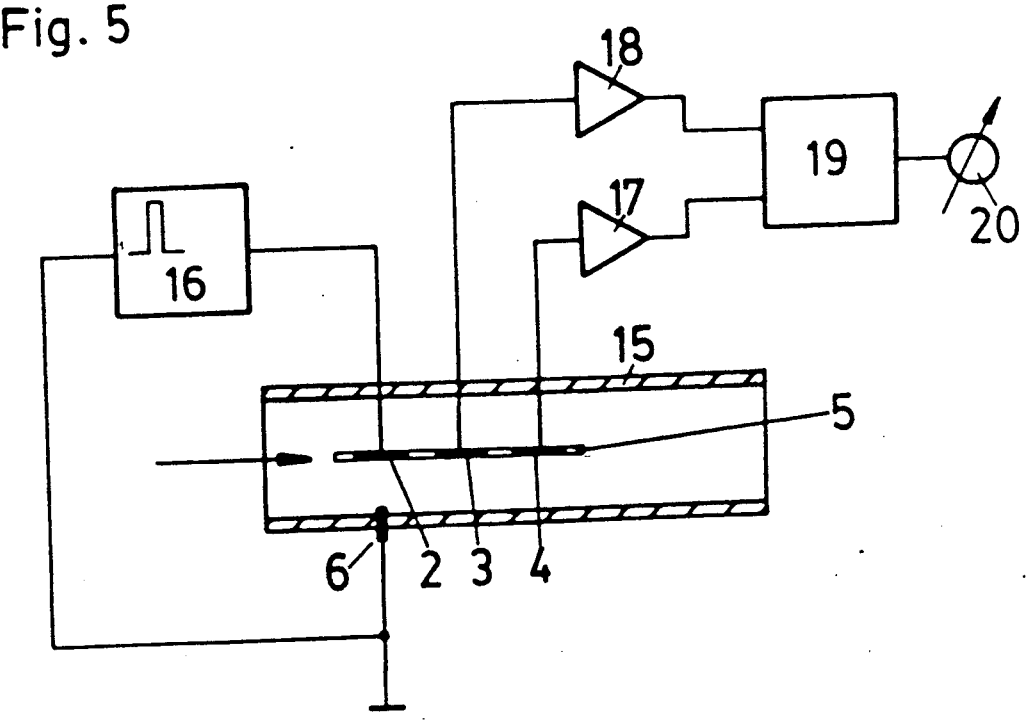
FIG. 5 a circuit for a sensor in accordance with FIG. 2 with a metallic tube wall as reference electrode.

In the circuit shown in FIG. 5, a plastic tube 15 with a reference electrode 6 is again used. The work electrode 2 and the test electrodes 3, 4 are inserted directly into the lamellar electrode support 5. Pulse generator 16, d.c. voltage amplifiers 17, 18, transit-time measuring device 19 and the indicator instrument 20 are the same as in the arrangement described for FIG. 4.

As shown in FIGS. 3, 4 and 5, the flow volume may be determined by a tube in which the electrodes are built-in, advantageously on an electrode support. However, it also appears useful for various application purposes to attach the electrodes on a freely positionable electrode support, the flow volume being determined through the measuring site, in the case of in vivo measurements of the flow velocity in an artery, for example. A catheter can also be used advantageously as the electrode support, the work and test electrodes being attached to its external surface. The marker volume is then generated from the flowing body fluid, e.g. the blood.

What is claimed is:

1. A process for measuring flow, comprising the steps or: generating a marker volume by applying an electric voltage to a volume of electrolytic body-related fluid running through a measured length in a direction of flow, and calculating a value corresponding to the flow speed by determining the transit time of the marker volume in the measured length, wherein the step of generating a marker volume for electrolytic body-related fluid comprises producing a short-term electrolytic breakdown of the fluid by applying a voltage of less than 24 V.

2. The process according to claim 1, wherein the marker volume is generated in the flowing fluid by applying direct current voltage pulses.

3. The process according to claim 2, wherein the duration of the direct current voltage pulses is less than 50 msec with pulse spacing of more than 1 second.

4. The process according to claim 1, wherein the transit time of the marker volume is determined by conductivity measurements.

5. The process according to claim 1, wherein the transit time of the marker volume is determined by potentiostatic measurements.

6. The process according to claim 1, wherein the transit time of the marker volume is determined by potentiostatic measurements using semiconductor detectors.

7. The process according to claim 1, wherein the step of applying a voltage comprises in addition applying at least one of a direct current and an alternating current field.

8. The process according to claim 1, further comprising identifying the fluid from the progress of the calculated value over time.

9. An apparatus for measuring flow of an electrolytic body related fluid, comprising: means defining a measured flow length receptive of an electrolytic body related fluid upstream of the measured length comprising at least one work electrode and means for applying a voltage of less than 24 volts to the at least one work electrode to produce a short-term electrolytic breakdown of the fluid, means for determining the transit of the marker volume in the measured length to calculate flow speed therefrom and a flow guide element located in the vicinity of the electrodes.

10. The apparatus according to claim 9, wherein the flow guide element comprises a planar electrode support.

11. The apparatus according to claim 10, wherein the electrodes comprise coatings on the planar electrode support.

12. The apparatus according to claim 9, further comprising means forming a cavity upstream of the measured length comprising a wall and further comprising at least one reference electrode located near the wall in the vicinity of the work electrodes.

13. The apparatus according to claim 9, further comprising means forming a cavity upstream of the measured length comprising a hose coupling with inlet and outlet connections.

14. The apparatus according to claim 9, wherein the guide element comprises a dielectric support and wherein the test electrodes and work electrodes comprise two coatings on both sides of a dielectric support to form a capacitor.

15. The apparatus according to claim 9, wherein the guide element comprises a freely positionable electrode support on which the work and test electrodes are located.

16. The apparatus according to claim 15, wherein the electrode support comprises a catheter with the electrodes located on an exterior surface.

* * * * *